United States Patent Office 2,925,158
Patented Feb. 16, 1960

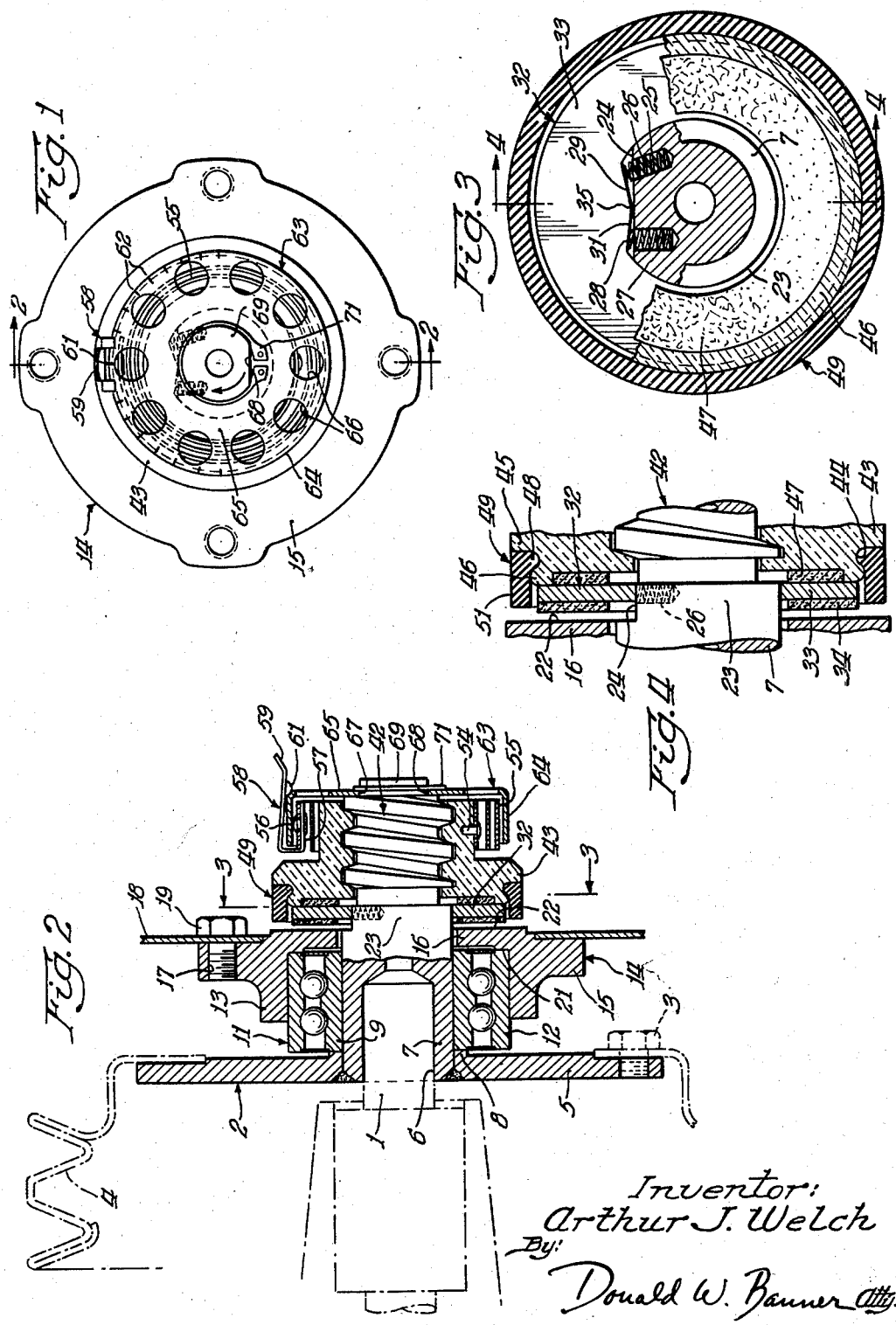

2,925,158

THERMOSTATICALLY CONTROLLED CLUTCH

Arthur J. Welch, Oak Park, Ill., assignor to Borg-Warner Corporation, Chicago, Ill., a corporation of Illinois Application February 26, 1957, Serial No. 642,584

7 Claims. (Cl. 192—82)

This invention relates to clutch devices, and more particularly to clutch devices responsive to ambient conditions particularly suited for controlilng engagement between driving means and a fan device.

In the copending application of Sylvan J. Becker, Serial No. 628,108, entitled "Thermostatically Controlled Clutch," filed December 13, 1956, there is shown, described and claimed a novel clutch device particularly suitable for use in an automotive type vehicle, the device being thermally actuable to selectively drive the vehicle fan. The present invention is an improvement over that device which is especially suitable for heavier duty requirements. For example the present invention is particularly useful in automotive vehicles having air conditioning equipment in which the condenser thereof limits the flow of air through the vehicle radiator, and in vehicles having protracted duty cycles of relatively low engine speed, although the device is not so limited.

One object of the present invention, therefore, is the provision of a new and improved thermally actuable clutch means characterized by improved locking and unlocking characteristics.

Another object of the present invention is the provision of a device in accordance with the preceding object in which a clutch plate is provided for transmitting torque from a driving member to a driven member, opposed biasing means being provided which urge the clutch plate toward a position intermediate opposite limits of the rotative movement relative to the driving member.

Another object is the provision of a device in accordance with the preceding objects in which the opposed biasing means comprise a pair of spaced spring members of differing force characteristics.

Another object is the provision of a device in accordance with the preceding objects in which the clutch plate is moved into engagement with the driven member by an axially movable and thermally responsive part, friction means being provided between this part and the clutch plate to facilitate locking and unlocking of the clutch.

Other objects and features of the invention will be readily apparent to those skilled in the art from the specification and appended drawings illustrating certain preferred embodiments in which:

Figure 1 is a front elevational view of a device constructed in accordance with the principles of the present invention;

Figure 2 is an enlarged sectional view along the plane of line 2—2 of Figure 1;

Figure 3 is an enlarged sectional view along the plane of line 3—3 of Figure 2;

Figure 4 is a sectional view along the plane of line 4—4 of Figure 3.

In the figures there is disclosed a device constructed in accordance with the principles of the present invention disposed in a typical automotive environment. There is illustrated a shaft 1 adapted to drive the water pump (not shown) of the vehicle, which is fixedly attached to a generally annular drive member 2, T-shaped in cross section, which is connected by bolts 3 to a pulley 4 conventionally driven by the fan belt of the vehicle. The member 2 comprises a generally annular plate 5 of steel or other suitable material having a central, circular opening 6 therein through which extends a drive part 7 having a circular outer periphery disposed within the opening 6, part 7 being also preferably made of steel and welded or otherwise fixedly joined to plate 5 and provided with a driving connection to the shaft 1. It will therefore be seen that all times during the period of rotation of the pulley 4 by the fan belt, the plate 5 and the drive part 7 will be continually rotated, and effect consequent continual rotation of the shaft 1 and the water pump connected thereto.

Plate 5 has a central, annular flange portion 8 against which is disposed the inner, annular race 9 of a double row radial-thrust ball bearing 11, race 9 being seated on a complementary annular peripheral portion of the drive part 7. The bearing 11 is further provided with an outer annular race 12 upon which is seated a horizontally extending portion 13 of a fan carrier 14. Carrier 14 is generally annular in configuration, and has the cross sectional shape illustrated in Figure 2. Projecting radially outwardly from the portion 14 is an annular outer portion 15, and projecting radially inwardly from the portion 13 is an annular portion 16. The outer portion 15 is provided with a plurality of circumferentially spaced, threaded openings 17; as illustrated in Figure 2, the carrier 14 is adapted for carrying an automotive fan 18 which has a central, circular opening therein seated upon the outer surface of portion 13 and having circumferentially spaced openings therein through which bolts 19 extend respectively, the inner threaded portions of bolts 19 being received in the threaded, complementary portions of the openings 17 so that the fan 18 is fixedly mounted to the carrier 14. Carrier 14 is prevented from rearward axial movement by the inner, annular surface 21 on the portion 16 of carrier 14, the surface 21 extending radially and being disposed in engagement with the race 12 of the bearing 11. Portion 16 is further provided with a forwardly facing, radially extending surface 22, parallel to the surface 21 which, as will be more fully described hereinafter, serves as an annular clutch surface. The carrier 14 is preferably formed of a material such as cast iron to ensure the effectiveness of this clutch surface.

The drive part 7, immediately forwardly (to the right in Figure 2) of the portion thereof surrounded by the carrier 14, is provided with a portion 23 of cross section best illustrated in Figure 3. This portion 23 has a generally circular outer periphery interrupted by a flat surface 24. Through surface 23 there is drilled a first opening 25, projecting at an angle of approximately 20° with respect to a perpendicular to surface 24, opening 25 receiving a coiled compression spring 26 which normally projects outwardly beyond the end of opening 25. Through surface 24 there is also drilled a second opening 27, perpendicular to surface 24, which receives a coiled compression spring 28 which also extends outwardly beyond the plane of surface 24, but to a lesser extent than does spring 26. Springs 26 and 28 are so chosen that the former supplies a substantially less biasing force than the latter, preferably being of the order of three to one. In the normal disengaged condition of the device illustrated in Figure 3, springs 26 and 28 extend outwardly from their respective openings and into respective engagement with flat surfaces 29 and 31 formed on a clutch plate indicated in general by the number 32. The clutch plate 32 consists of a generally annular steel backing member 33 which carries on its rearwardly facing surface (to the left in Figures 2 and 4) an annular facing 34 of friction material glued or otherwise rigidly mounted to the backing member 33. A typical example of a suitable material is the brake lining sold by the Gatke Corporation under the designation style No. 2460. The central portion of the backing member 33 is provided with an opening of the configuration best illustrated in Figure 3, this opening being generally circular throughout the major portion thereof and in complementary engagement with the outer periphery of portion 23, this generally circular portion terminating in the before described surfaces 29 and 31. These surfaces 29 and 31 extend radially inwardly to meet along a common line 35, in engagement with the surface 24. Surfaces 29 and 31 are so formed that when the clutch plate 32 is positioned such that these surfaces diverge radially outwardly equal amounts from a horizontally extending plane through the line 35, each of these surfaces will define an angle of approximately 10 degrees with that horizontal. As will be seen from Figure 3, however, in the normal disengaged condition of the device, springs 26 and 28 will position the clutch plate 32 such that the surface 29 thereon defines an angle of approximately 15 degrees with the horizontal surface 24, while the surface 31 on the clutch plate defines an angle of approximately 5 degrees with the horizontal surface 24. Inasmuch as the springs 26 and 28 are of unequal biasing force, it manifestly is necessary, in order to achieve this particular positioning of the clutch plate 32, to make weaker spring 26 project beyond the surface 24 in the normal relaxed condition of that spring more than stronger spring 28 projects beyond surface 24 in the normal relaxed position thereof.

Immediately forwardly of the portion 23, the drive part 7 is provided with an externally threaded portion 42. This portion 42 is preferably provided with acme standard 29 degree stub threads, three threads per inch, the threads being left hand threads. Carried by this threaded portion 42 is a generally annular nut 43 having internal threads complementary to those provided on the threaded portion 42 of the drive part 7. Nut 43 preferably is formed of a phenolic resin moulded to have the acme left hand threads provided on an interior opening therein, and if desired a bronze powder may be incorporated in the phenolic resin material prior to molding which will act as a mild lubricant to lower the coefficient of friction of the phenolic resin. Nut 43 is also molded so as to have an annular recess 44 therein between portions 45 and 46 thereon of different diameters, as shown in the Figure 4. The rearmost face (to the left in Figures 2 and 4) of nut 43 is provided with a circular, shallow groove in which is disposed an annular facing 47 of friction material similar to that of the facing 34, the facing 47 being glued or otherwise rigidly mounted to the nut 43. Disposed within the recess 44 is a flanged portion 48 of an annular buffer 49 which comprises a neoprene rubber body 51. The buffer 49 is initially constructed such that the annular flange 48 on the body 51 is of substantially smaller diameter than that of the remainder of the body 51; when the buffer 49, therefore, is snapped into the position illustrated in Figure 4, the diameter of the flanged portion 48 thereof is stretched outwardly so that the buffer 49 is under tension and will not, therefore, rotate relative to the nut 43. In this assembled position with the nut 43, it will be seen that the buffer 49 overlies a portion of the clutch plate 32.

The forwardmost portion of the nut 43 is annular in configuration and of relatively reduced diameter and attached thereto by suitable means, such as a rivet 54, is one end of a spirally wound bimetal 55. The opposite end of bimetal 55 is connected by a suitable rivet 56 to the inner leg 57 of a generally U-shaped clip 58 which has an outer, longer leg 59. This clip 58 has an integral detent 61 projecting inwardly from the inner surface of leg 59 which is received between a pair of a plurality of serrations 62 formed on an outer surface of a generally cup shaped member 63 comprising an axially extending annular portion 64 and a forwardly facing, radially extending portion 65. As best illustrated in Figure 2, the clip 58 is carried by the portion 64 of the cup 63. As best illustrated in Figure 1, the radially extending portion 65 of the cup 63 is provided with a plurality of circumferentially spaced openings 66 through which heated air from the radiator—or other portions—of the vehicle in which the device of the present invention is disposed may pass to contact the bimetal 55. The cup 63 is provided also with a central opening 67 generally circular in configuration but provided with a flat side 68, this opening 67 being disposed in engagement with a complementary shaped portion 69 at the most forward part of the drive part 7 so that the cup 63 is prevented from rotating relative to the drive part 7. A bowed snap ring 71 is provided in a suitable slot in the part 69 of the drive part 7 to prevent vibration of cup 63 and forward axial movement of the cup 63 relative to the drive part 7, the inner wall of radially extending portion 65 of the cup 63 being disposed in engagement with a shoulder formed on the forward portion of the drive part 7 whereby rearward axial movement of the cup 63 is also prevented.

It should be understood that the device illustrated in the figures is mounted in the automotive vehicle so that the forward end of the drive part 7 (the right end from the view of Figure 2) is adjacent the rear surface of the vehicle radiator. Air passing through the radiator will, of course, be heated and, as previously explained, will pass through the openings 66 in the cup 63 so that the bimetal 55 may operate in response to this heated air. The bimetal 55 is so constructed and arranged that it biases the nut 43 toward the position illustrated in the figures when the bimetal temperature is sufficiently low. Under these conditions, as illustrated in the figures, when the fan belt drives the pulley 4, the drive part 7 and the shaft 1—and therefore the water pump—will be continuously rotated. The nut 43, the cup 63, bimetal 55, and the clutch plate 32, will also be rotated, spring 28 being sufficiently strong to hold the clutch plate 32 in substantially the position relative to the drive part 7 illustrated in Figure 3. In a normal automotive installation, the direction of this rotation is clockwise when viewed from the front of the vehicle, as indicated by the arrow on Figure 1. Under these conditions, the fan carrier 14 will not be driven with the drive part 7, but will rotate in the same direction as that of drive part 7 but at a slower speed, this rotation resulting from the bearing drag and from the pitch of the fan blades 18 connected to the carrier 14 when the vehicle is moving forwardly. It is important to notice that during this condition the carrier 14 is absorbing practically no power from the engine of the vehicle.

As previously indicated during the normal disengaged condition of the device, the springs 26 and 28 hold the clutch plate 32 in a position relative to portion 23 of drive part 7 substantially as indicated in Figure 3, the flat surface 29 being spaced from the flat surface 24 by an angle approximately 15 degrees, while the flat surface 31 is spaced from the surface 24 by approximately 5 degrees. When the bimetal 55, however, is heated sufficiently by the air passing through the vehicle radiator, the bimetal will effect rotation of the nut 43 in a direction to effect rearward axial movement thereof (to the left in Figures 2 and 4). Because of the left hand threads on the nut 43 and the portion 42, this rotation of the nut 43 will be in a counterclockwise direction with respect to the driving part 7 when viewed from the front of the vehicle (to the right in Figures 2 and 4). This rearward axial movement of the nut 43 will, of course, force rearward movement of clutch plate 32 so that the friction facing 34 thereon will engage the clutch face 22 on the fan carrier 14.

As previously described, the fan carrier 14 at this instant will be rotating in the same direction relative to the drive part 7 as the nut 43, but at a greater relative speed than the nut 43 is rotating with respect to the drive part 7. As a result of the frictional engagement between the clutch plate 32 and the fan carrier 14, the clutch plate 32 will be rotated against the bias of spring 28 through an arc of approximately 5 degrees until surfaces 31 and 24 are in engagement. Because of the frictional contact between clutch plate 32 and friction facing 47 on the nut 43, the nut 43 will be further rotated in the same direction relative to the drive part 7 as was imparted to it by the bimetal 55. The net result of these interactions is a self-energizing effect on the nut 43, due to the tendency of the fan to lag so that the nut 43 tightly clamps the clutch plate 32 into tight frictional engagement with the fan carrier 14. The carrier 14, and the fan blades 18 connected thereto, will therefore be directly driven from the drive part 7 through the clutch plate 2. The fan will then be diven from the vehicle engine in the customary fashion.

This relationship will continue until the occurrence of two conditions. More specifically, as the heated air which passes through the vehicle radiator decreases in temperature, the bimetal 55 temperature will also decrease. As the bimetal 55 is cooled, it tends to move the nut 43 forwardly (to the right in Figures 2 and 4). It will be apparent, however, that the fan 18 will tend to lag behind the drive part 7, and that the friction between the clutch surface 22 on the fan carrier 14 and the clutch plate 32—and the friction between the clutch plate 32 and the friction facing 47 on the nut 43—will tend to keep the nut 43 in its rearward, "locked up" condition. This force is greatly in excess of that applied by the bimetal 55, and as a result the fan 18 will continue to be driven from the drive part 7 as long as speed of the drive part 7 exceeds that of the fan. When the drive part 7, however, has its rotative speed reduced suddenly—as for example when the driver of the vehicle permits its accelerator to move from a substantially depressed position to a substantially released position—the inertia of the fan 18 is such that the carrier 14 will overrun the drive part 7. Keeping in mind the frictional engagement between the carrier 14, the clutch plate 32, and the nut 43, it will be seen that this overrunning action of the carrier 14 will effect rotation of the clutch plate 32 in a clockwise direction, in the view of Figure 3, against the bias of the weak spring 26, this movement being assisted in some degree by the strong spring 28. Clutch plate 32 will rotate relatively freely throughout the lost motion movement permitted to it by the aforementioned space between the flat surface 24 on the drive part 7 and the flat surface 29 on the clutch plate 32. Because of the frictional engagement between the clutch plate 32 and the friction facing 47 on the nut 43, nut 43 will also be rotated freely with the clutch plate 32. It is significant to note that the direction of this rotation of the nut 43 is such as to effect its movement to the right in Figures 2 and 4, permitting the clutch plate 32 to move away from the clutch surface 22 on the carrier 14. Inasmuch as it has been assumed that bimetal 55 is now relatively cool, the force which it applies to the nut 43 will tend to continue its movement away from the carrier 14 until the parts assume the position assumed in Figures 2 and 4. As soon as the frictional engagement between the clutch plate 32 and the carrier 14 is broken, the springs 26 and 28 will return the clutch plate 32 to the position illustrated in Figure 3, clutch plate 32 being held poised intermediate its two rotative limits. It will be apparent that this unlocking action is rapidly and effectively accomplished by virtue of the lost motion connection between the clutch plate 32 and the drive part 7, the bias applied to the clutch plate 32 by the spring 28 and the frictional engagement between the clutch plate 32 and the nut 43.

Assuming that the bimetal 55 should again be heated by the air coming from the vehicle radiator—or from any other source—the afore described cycle will be repeated; the nut 43 will be moved to the left in Figures 2 and 4 until the clutch plate 32 engages the carrier 14, nut 43 then being moved further to the left once again to tightly lock the parts together whereby a drive is effected by the drive part 7 and the fan 18. It should be noted that while the bimetal remains heated, no matter how rapidly the speed of the drive part 7 is decreased to effect a momentary overrunning condition of the carrier 14, although the clutch plate 32 may momentarily effect a forward movement of the nut 43 as a result of this overrunning of the carrier 14, the force of the bimetal 55 will immediately re-effect engagement of the clutch plate 32 with the carrier 14 to re-establish the drive from drive part 7 to the fan 18 almost instantaneously.

The means for changing the temperature at which the bimetal 55 will operate are best illustrated in Figures 1 and 2, and comprises a clip 58 attached to one end of the bimetal. Clip 58 has a detent 61 on an arm 59 thereof which may be positioned in serrations 62 provided on the cup 64 to vary the initial stress of the bimetal 55.

The present invention provides for shockless, rapid and forceful locking action so that the carrier 14 may be driven from the drive part 7. This locking action is self-energizing, strong frictional connections between the carrier, clutch plate and the nut being provided to assure this result. Conversely, unlocking action is also assured, despite a heavy fan load or relatively little change in rotative speed between the drive part 7 and the carrier 14, when the speed of the former is reduced below that of the latter, by the tight frictional engagement of the carrier 14, the clutch plate 32 and the nut 43, the action being materially assisted by the biasing effect of the strong spring 28.

While a certain preferred embodiment of the invention has been specifically disclosed, it is understood that the invention is not limited thereto, as many variations will be readily apparent to those skilled in the art and the invention is to be given its broadest possible intepretation within the terms of the following claims:

What is claimed is:

1. In a clutch device to effect engagement between a driving member and a vehicle fan, comprising a driving member adapted to be rotated, a driven member normally rotatable relative to said driving member, clutch plate means on said driving member adjacent said driven member axially and rotatably movable relative to said driving member, means limiting the degree of rotation of said clutch plate means in both directions relative to said driving member, a plurality of opposed biasing means respectively disposed in said driving member urging said clutch plate means in opposite directions and together urging said clutch plate means toward a position intermediate the limits of its rotative movement relative to said driving member, and thermally actuated means operable to effect axial movement of said clutch plate means to establish torque transmitting drive between said driving and driven members through said clutch plate means.

2. In a clutch device to effect engagement between a driving member and a vehicle fan, comprising a driving member adapted to be rotated, a driven member normally rotatable relative to said driving member, clutch plate means on said driving member adjacent said driven member axially and rotatably movable relative to said driving member, frictional means adapted to transmit torque between said clutch plate means and said driven member when said clutch plate means are moved into operable relation with said drive member, means limiting the degree of rotation of said clutch plate means in both directions relative to said driving member, a plurality of opposed biasing means respectively disposed in said driving member urging said clutch plate means in opposite directions and together urging said clutch plate means toward a position intermediate the limits of its rotative movement relative to said driving member, and thermally actuated means operable to effect axial movement of said clutch plate means to establish frictional torque transmitting drive between said clutch plate means and said driven member.

3. The device defined in claim 2 in which other frictional means are provided adapted to transmit torque between said clutch plate means and said thermally actuated means.

4. In a clutch device to effect engagement between a driving member and a vehicle fan, comprising a driving member adapted to be rotated, a driven member normally rotatable relative to said driving member, clutch plate means on said driving member adjacent said driven member axially and rotatably movable relative to said driving member, means on said clutch plate means permitting limited rotative movement thereof relative to said driving member, a plurality of opposed resilient means respectively disposed in said driving member and biasing said clutch plate means in opposite directions and together urging said clutch plate means toward a position intermediate the limits of its rotative movement relative to said driving member, and thermally actuated means operable to effect axial movement of said clutch plate means to establish torque transmitting drive between said driving and driven members through said clutch plate means.

5. The device defined in claim 4 in which said plurality of resilient means comprise first spring means opposing rotation of said clutch plate means in one direction relative to said driving means and second spring means opposing rotation of said clutch plate means in the opposite direction relative to said driving means.

6. The device defined in claim 5 in which said first spring means are greater in biasing force than said second spring means.

7. The device defined in claim 5 in which first frictional means are provided adapted to transmit torque between said clutch plate means and said driven member, and in which second frictional means are provided adapted to transmit torque between said clutch plate and said thermally actuated means.

References Cited in the file of this patent

UNITED STATES PATENTS

| 2,005,468 | Modine | June 18, 1935 |
| 2,729,078 | Schmidt | Jan. 3, 1956 |

FOREIGN PATENTS

| 406,934 | Germany | Dec. 4, 1924 |